United States Patent
Sadamitsu

(10) Patent No.: US 10,957,926 B2
(45) Date of Patent: Mar. 23, 2021

(54) FUEL CELL SYSTEM AND CONTROL METHOD OF FUEL CELL SYSTEM

(71) Applicant: TOYOTA JIDOSHA KABUSHIKI KAISHA, Toyota (JP)

(72) Inventor: Takahiro Sadamitsu, Myoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 48 days.

(21) Appl. No.: 16/157,600

(22) Filed: Oct. 11, 2018

(65) Prior Publication Data
US 2019/0123367 A1 Apr. 25, 2019

(30) Foreign Application Priority Data
Oct. 20, 2017 (JP) .............................. JP2017-203170

(51) Int. Cl.
*H01M 8/04746* (2016.01)
*H01M 8/04111* (2016.01)
*H01M 8/0438* (2016.01)

(52) U.S. Cl.
CPC .... *H01M 8/04753* (2013.01); *H01M 8/04111* (2013.01); *H01M 8/04395* (2013.01); *H01M 2250/20* (2013.01)

(58) Field of Classification Search
CPC ......... H01M 8/04753; H01M 8/04111; H01M 8/04395
See application file for complete search history.

(56) References Cited

U.S. PATENT DOCUMENTS

| | | | |
|---|---|---|---|
| 2011/0097632 | A1 | 4/2011 | Sumser et al. |
| 2012/0251900 | A1 | 10/2012 | Sugawara et al. |
| 2016/0218383 | A1* | 7/2016 | Hanschke .......... H01M 8/04111 |
| 2018/0034086 | A1* | 2/2018 | Yoshioka .............. F16K 1/2028 |

FOREIGN PATENT DOCUMENTS

| | | |
|---|---|---|
| DE | 102007007934 A1 | 8/2008 |
| EP | 3 435 461 A1 | 1/2019 |
| JP | 60-160574 A | 8/1985 |
| JP | 2007-077906 A | 3/2007 |
| JP | 2012-504301 A | 2/2012 |
| JP | 2012-216380 | 11/2012 |
| JP | 2013-182781 | 9/2013 |
| KR | 101459484 B1 | 11/2014 |
| WO | WO2017/163499 A1 | 9/2017 |

* cited by examiner

*Primary Examiner* — Tae-Sik Kang
(74) *Attorney, Agent, or Firm* — Finnegan, Henderson, Farabow, Garrett & Dunner, LLP

(57) ABSTRACT

A fuel cell system includes a motor driving a compressor that supplies air to a fuel cell, a turbine assisting the compressor, a bypass valve that opens and closes the bypass flow path, and a controller. When a required air flow rate is equal to or higher than a threshold value, the controller closes the bypass valve and controls the motor to cause the air to flow through the fuel cell at a flow rate corresponding to the required air flow rate. When the required air flow rate is lower than the threshold value, the controller opens the bypass valve to cause the air to flow through the bypass flow path and controls the motor to cause the air to flow through the fuel cell at the flow rate corresponding to the required air flow rate.

10 Claims, 12 Drawing Sheets

FIG. 4

BYPASS VALVE TARGET
OPENING DEGREE MAP

| REQUIRED AIR PRESSURE | $\triangle G$ | BYPASS VALVE TARGET OPENING DEGREE |
|---|---|---|
| X1 | Y1 | Z11 |
| X1 | Y2 | Z12 |
| X1 | Y3 | Z13 |
| X2 | Y1 | Z21 |
| ⋮ | | |

FUEL CELL SYSTEM AND CONTROL METHOD OF FUEL CELL SYSTEM

INCORPORATION BY REFERENCE

The disclosure of Japanese Patent Application No. 2017-203170 filed on Oct. 20, 2017 including the specification, drawings and abstract is incorporated herein by reference in its entirety.

BACKGROUND

1. Technical Field

The disclosure relates to a fuel cell system and a control method of the fuel cell system.

2. Description of Related Art

Regarding a fuel cell system, Japanese Unexamined Patent Application Publication No. 2013-182781 (JP 2013-182781 A), for example, discloses an air supply rotating machine that is driven by a drive motor and an expander rotating by energy of a cathode off-gas to supply air to a cathode of a fuel cell.

SUMMARY

In the fuel cell system described in JP 2013-182781 A, a flow rate of air required by a fuel cell is small in an operation state in which a required output power of the fuel cell is small. Therefore, a flow rate of air discharged by the air supply rotating machine (compressor) decreases. In this case, a supply flow rate of the cathode off-gas supplied to the expander (turbine) also decreases and a driving force by the turbine decreases. Thus, there is a possibility that efficiency of the compressor decreases and a fuel economy of the fuel cell system deteriorates.

The disclosure has been made to solve the above-mentioned problem and may be realized in the following forms.

(1) A first aspect of the disclosure relates to a fuel cell system including a fuel cell, an air supply flow path, an air discharge flow path, a compressor, a motor, a turbine, a bypass flow path, a bypass valve, and a controller. The air supply flow path is configured to supply air to the fuel cell. The air discharge flow path is configured to discharge the air from the fuel cell. The compressor is configured to supply the air to the air supply flow path. The motor is configured to drive the compressor. The turbine is disposed in the air discharge flow path to assist driving of the compressor by the motor. The bypass flow path is configured to bring a downstream side of the compressor in the air supply flow path into communication with an upstream side of the turbine in the air discharge flow path. The bypass valve is configured to open and close the bypass flow path. The controller is configured to control driving of the motor and opening and closing of the bypass valve according to a required air flow rate that is an air flow rate required for power generation of the fuel cell. When the required air flow rate is equal to or higher than a predetermined threshold value, the controller performs a first control in which (i) the bypass valve is closed and (ii) the driving of the motor is controlled to cause the air to flow through the fuel cell at a flow rate corresponding to the required air flow rate, and when the required air flow rate is lower than the predetermined threshold value, the controller performs a second control in which (i) the bypass valve to cause the air to also flow through the bypass flow path is opened and (ii) the driving of the motor is controlled to cause the air to flow through the fuel cell at the flow rate corresponding to the required air flow rate. With the fuel cell system of this form, when the required air flow rate is low, the air supplied by the compressor is directly supplied not only to the fuel cell but also to the turbine for assisting the driving of the compressor through the bypass flow path. Therefore, it is possible to reduce the power consumption of the motor for driving the compressor, without lowering the flow rate of the air supplied to the fuel cell. This makes it possible to improve the fuel economy of the fuel cell system.

(2) In the fuel cell system according to the aspect described above, the predetermined threshold value may be a value determined based on a flow rate at which power consumption of the motor with respect to a flow rate of air discharged from the compressor in the fuel cell system becomes minimal. With this fuel cell system, it is possible to further improve the fuel economy of the fuel cell system.

(3) In the fuel cell system according to the aspect described above, when an increase amount of the required air flow rate per unit time is equal to or larger than a predetermined increase amount, the controller may close the bypass valve regardless of whether or not the required air flow rate is lower than the predetermined threshold value. With this fuel cell system, when the increase amount of the required air flow rate per unit time is increased to or above the predetermined increase amount, it is possible to prevent the air having the flow rate corresponding to the increased required air flow rate from flowing toward the bypass flow path. As a result, when the increase amount of the required air flow rate per unit time is increased to or above the predetermined increase amount, it is possible to suppress a delay in the supply of air to the fuel cell.

(4) The fuel cell system according to the aspect described above may further include an accumulator tank connected to a downstream side of the bypass valve in the bypass flow path and configured to store the air flowing through the bypass flow path. With this fuel cell system, a part of the air flowing through the bypass flow path can be stored in the accumulator tank during the second control. Therefore, even when the control is switched and the bypass valve is closed, the air stored in the accumulator tank during the second control can be supplied to the turbine. Therefore, even when the bypass valve is in a closed state, it is possible to increase the driving force by the turbine for assisting driving of the compressor by the motor.

(5) The fuel cell system according to the aspect described above may further include a pressure regulating valve disposed on an upstream side of the turbine in the air discharge flow path and on a downstream side of a connection portion between the bypass flow path and the air discharge flow path and configured to regulate a pressure of the air flowing through the fuel cell. With this fuel cell system, it is possible to suppress abrupt fluctuation of the pressure on the upstream side of the pressure regulating valve. Thus, it is possible to prevent the pressure inside the fuel cell from rapidly decreasing along with, for example, the opening and closing of the bypass valve.

(6) In the fuel cell system according to the aspect described above, a valve box of the pressure regulating valve may be formed integrally with a turbine housing of the turbine, and a valve body of the pressure regulating valve may be disposed on an upstream side of a turbine wheel in the turbine. With this fuel cell system, by adjusting the opening degree of the pressure regulating valve, it is possible to change the flow velocity of the air blown to the turbine wheel. Therefore, the configuration of the fuel cell system can be simplified, and the driving force by the turbine for assisting the driving of the compressor by the motor can be increased.

(7) In the fuel cell system according to the aspect described above, the bypass flow path may be connected to an inside of a turbine housing of the turbine, a valve box of the bypass valve may be formed integrally with the turbine housing, and a valve body of the bypass valve may be disposed on an upstream side of a turbine wheel in the turbine. With this fuel cell system, it is possible to simplify the configuration of the fuel cell system.

(8) In the fuel cell system according to the aspect described above, the bypass flow path may be connected to an inside of a turbine housing of the turbine, and an opening of the bypass flow path in the turbine housing may be oriented to cause the air flowing from the bypass flow path into the turbine housing to flow in such a direction as to promote rotation of a turbine wheel of the turbine. With this fuel cell system, the air flowing into the turbine housing from the bypass flow path promotes the rotation of the turbine wheel. Therefore, the configuration of the fuel cell system can be simplified, and the driving force by the turbine for assisting the driving of the compressor by the motor can be increased.

(9) In the fuel cell system according to the aspect described above, the controller may perform the second control with a rotation speed of the motor being kept constant. With this fuel cell system, it is possible to suppress an increase in power consumption of the motor during the second control. Therefore, it is possible to improve the fuel economy of the fuel cell system.

(10) In the fuel cell system according to the aspect described above, the controller may perform the second control with a pressure ratio being kept constant, the pressure ratio being a ratio of a pressure of air sucked into the compressor and a pressure of air discharged from the compressor. With this fuel cell system, it is possible to suppress a decrease in the pressure in the fuel cell during the second control. Therefore, it is possible to suppress a decrease in the electric power generated by the fuel cell due to the drying of the electrolyte membrane of the fuel cell. This makes it possible to further improve the fuel economy of the fuel cell system.

(11) A second aspect of the present disclosure relates to a control method of a fuel cell system including a fuel cell, an air supply flow path configured to supply air to the fuel cell, an air discharge flow path configured to discharge the air from the fuel cell, a compressor configured to supply the air to the air supply flow path, a motor configured to drive the compressor, a turbine disposed in the air discharge flow path to assist driving of the compressor by the motor, a bypass flow path configured to bring a downstream side of the compressor in the air supply flow path into communication with an upstream side of the turbine in the air discharge flow path, and a bypass valve configured to open and close the bypass flow path, the method comprising. When a required air flow rate that is an air flow rate required for power generation of the fuel cell is equal to or higher than a predetermined threshold value, performing a first control in which (i) the bypass valve is closed and (ii) driving of the motor is controlled to cause the air to flow through the fuel cell at a flow rate corresponding to the required air flow rate. When the required air flow rate is lower than the predetermined threshold value, performing a second control in which (i) the bypass valve is opened to cause the air to also flow through the bypass flow path and (ii) the driving of the motor is controlled to cause the air to flow through the fuel cell at the flow rate corresponding to the required air flow rate.

The disclosure may also be realized in various forms other than the fuel cell system. For example, the disclosure may be realized in the form of a fuel cell vehicle, a method of opening and closing a bypass valve, and the like.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is an explanatory diagram showing a bypass valve target opening degree map;

DETAILED DESCRIPTION OF EMBODIMENTS

A. First Embodiment

Figure 1:
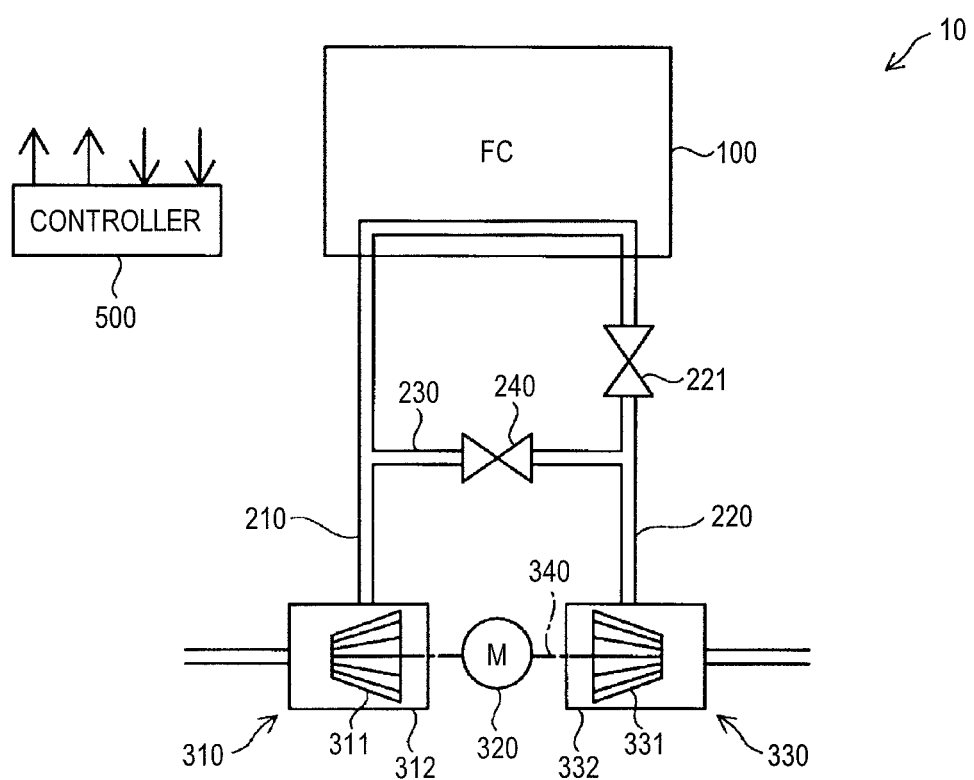
FIG. 1 is an explanatory diagram showing an outline of a fuel cell system according to a first embodiment.

FIG. 1 is an explanatory diagram showing an outline of a fuel cell system 10 according to a first embodiment. The fuel cell system 10 according to the present embodiment is mounted on, for example, a fuel cell vehicle and is used as a power generation device for driving a drive motor of the fuel cell vehicle. The fuel cell system 10 may be used as a stationary power generation device. The fuel cell system 10 includes a fuel cell 100, an air supply flow path 210, an air discharge flow path 220, a bypass flow path 230, a bypass valve 240, a compressor 310, a motor 320, a turbine 330, and a controller 500. Hereinafter, "upstream side" and "downstream side" in the specification refer to an upstream side and a downstream side in a flow direction of air, respectively.

The fuel cell 100 of the present embodiment is a solid polymer type fuel cell. The fuel cell 100 has a stack structure in which a plurality of cells is stacked. Each cell includes a membrane electrode assembly having electrode catalyst layers on both sides of an electrolyte membrane, and a pair of separators sandwiching the membrane electrode assembly. In each cell, a hydrogen gas as a fuel gas is supplied to an anode side of the membrane electrode assembly and air as an oxidizing gas is supplied to a cathode side of the membrane electrode assembly, whereby an electromotive force is generated by an electrochemical reaction. The respective cells are connected in series. A coolant flow path through which a coolant for cooling the fuel cell 100 circulates may be connected to the fuel cell 100.

The air supply flow path 210 is a flow path for supplying air to the cathode side of the fuel cell 100.

The compressor 310 is disposed on an upstream side of the air supply flow path 210. The compressor 310 sucks an air in the atmosphere from a suction side, pressurizes the air in the compressor 310, and supplies the pressurized air from a discharge side to the air supply flow path 210. The compressor 310 includes a compressor wheel 311 and a compressor housing 312. The compressor wheel 311 is an impeller for pressurizing air by rotation and is driven by the motor 320. The compressor housing 312 is a main body of the compressor 310 for accommodating the compressor wheel 311. The air sucked into the compressor housing 312 from the suction side of the compressor 310 is given a centrifugal force by the rotation of the compressor wheel 311. The air is pressurized by being pressed against an inner wall of the compressor housing 312 and is discharged from the discharge side of the compressor 310. In the present embodiment, a centrifugal compressor is used as the compressor 310. As the compressor 310, an axial flow type compressor may be used.

The motor 320 is an electric motor for driving the compressor 310.

The air discharge flow path 220 is a flow path for discharging air from the cathode side of the fuel cell 100.

The turbine 330 is disposed in the air discharge flow path 220. The turbine 330 assists the driving of the compressor 310 by the motor 320. The turbine 330 includes a turbine wheel 331 and a turbine housing 332. The turbine wheel 331 is an impeller for assisting the driving of the compressor 310 by rotation and is driven by air flowing in the turbine 330. The turbine housing 332 is a main body of the turbine 330 that accommodates the turbine wheel 331. The turbine wheel 331 disposed in the turbine housing 332 is rotated by air flowing into the turbine housing 332 from a suction side of the turbine 330. That is to say, the turbine 330 converts a kinetic energy of the air into a power for rotating the turbine wheel 331. The turbine wheel 331, the motor 320, and the compressor wheel 311 are connected by a common rotating shaft 340. Therefore, the driving of the motor 320 for rotating the compressor wheel 311 is assisted by the rotation of the turbine wheel 331. The air that has rotated the turbine wheel 331 is discharged from a discharge side of the turbine 330.

The bypass flow path 230 is a flow path that brings a downstream side of the compressor 310 in the air supply flow path 210 and an upstream side of the turbine 330 in the air discharge flow path 220 into communication with each other. The bypass flow path 230 has a smaller pressure loss than the air flow path in the fuel cell 100.

The bypass valve 240 is disposed in the bypass flow path 230. The bypass valve 240 is a valve that opens and closes the bypass flow path 230. In the present embodiment, a butterfly valve is used as the bypass valve 240. Alternatively, a globe valve may be used as the bypass valve 240.

In the present embodiment, a pressure regulating valve 221 is disposed in the air discharge flow path 220. More specifically, the pressure regulating valve 221 is disposed on a downstream side of the fuel cell 100 in the air discharge flow path 220 and on an upstream side of a connection portion between the bypass flow path 230 and the air discharge flow path 220. The pressure regulating valve 221 is a valve for regulating a pressure of air flowing in the fuel cell 100.

The controller 500 is configured as a computer including a CPU, a memory, and an interface circuit to which each component is connected. By executing a control program stored in the memory, the CPU controls the driving of the motor 320 and the opening and closing of the bypass valve 240 according to a required air flow rate. The term "required air flow rate" refers to a flow rate of air required for power generation in the fuel cell 100. For example, in a fuel cell vehicle, the controller 500 increases or decreases the required air flow rate in order to increase or decrease a generated power in the fuel cell 100 according to an opening degree of an accelerator of the fuel cell vehicle. In this specification, the term "flow rate" is used to mean a mass flow rate.

Figure 2:
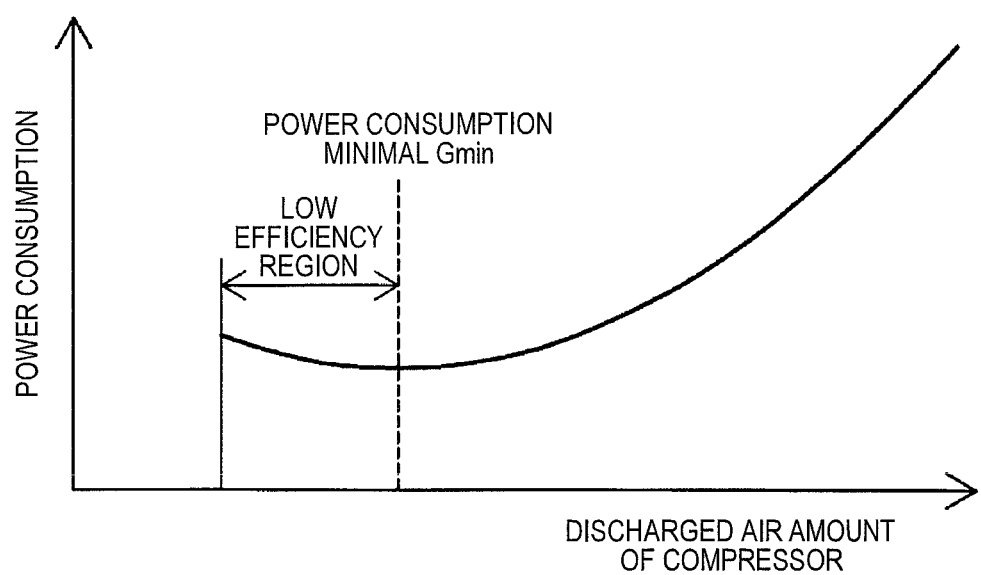
FIG. 2 is an explanatory diagram showing a relationship between a discharged air amount of a compressor and power consumption.

FIG. 2 is a graph showing a relationship between a flow rate (discharge air amount) of the air discharged from the compressor 310 and a power consumption of the motor 320 for driving the compressor 310 in the fuel cell system 10. The graph shown in FIG. 2 illustrates the relationship between the discharged air amount of the compressor 310 and the power consumption of the motor 320 when the bypass valve 240 is always kept in a closed state. The horizontal axis of the graph shown in FIG. 2 indicates the discharged air amount of the compressor 310. The vertical axis indicates the power consumption of the motor 320. In a region where the discharged air amount of the compressor 310 is large, the power consumption of the motor 320 increases as the discharged air amount of the compressor 310 is increased. On the other hand, in a region where the discharged air amount of the compressor 310 is small, when the discharged air amount of the compressor 310 is decreased, the driving force by the turbine 330 decreases due to a rolling friction of the turbine wheel 331, and the power consumption of the motor 320 increases. Therefore, in the graph shown in FIG. 2, there is a flow rate at which the power consumption of the motor 320 with respect to the discharged air amount of the compressor 310 becomes minimal. Hereinafter, a range in which the discharged air amount of the compressor 310 is smaller than the flow rate at which the power consumption of the motor 320 becomes minimal will be referred to as a "low efficiency region".

The discharged air amount of the compressor 310 is determined according to the required air flow rate. In the case of a fuel cell vehicle, the required air flow rate is determined according to the opening degree of the accelerator or the like. Therefore, when the opening degree of the accelerator is small, the required air flow rate also becomes small. Accordingly, the compressor 310 is driven in the low efficiency region, and the power consumption of the motor 320 may increase in some cases. Thus, the fuel cell system 10 of the present embodiment performs a bypass control described below to increase the discharged air amount of the compressor 310. As a result, the driving force by the turbine 330 is increased and the power consumption of the motor 320 is decreased.

Figure 3:
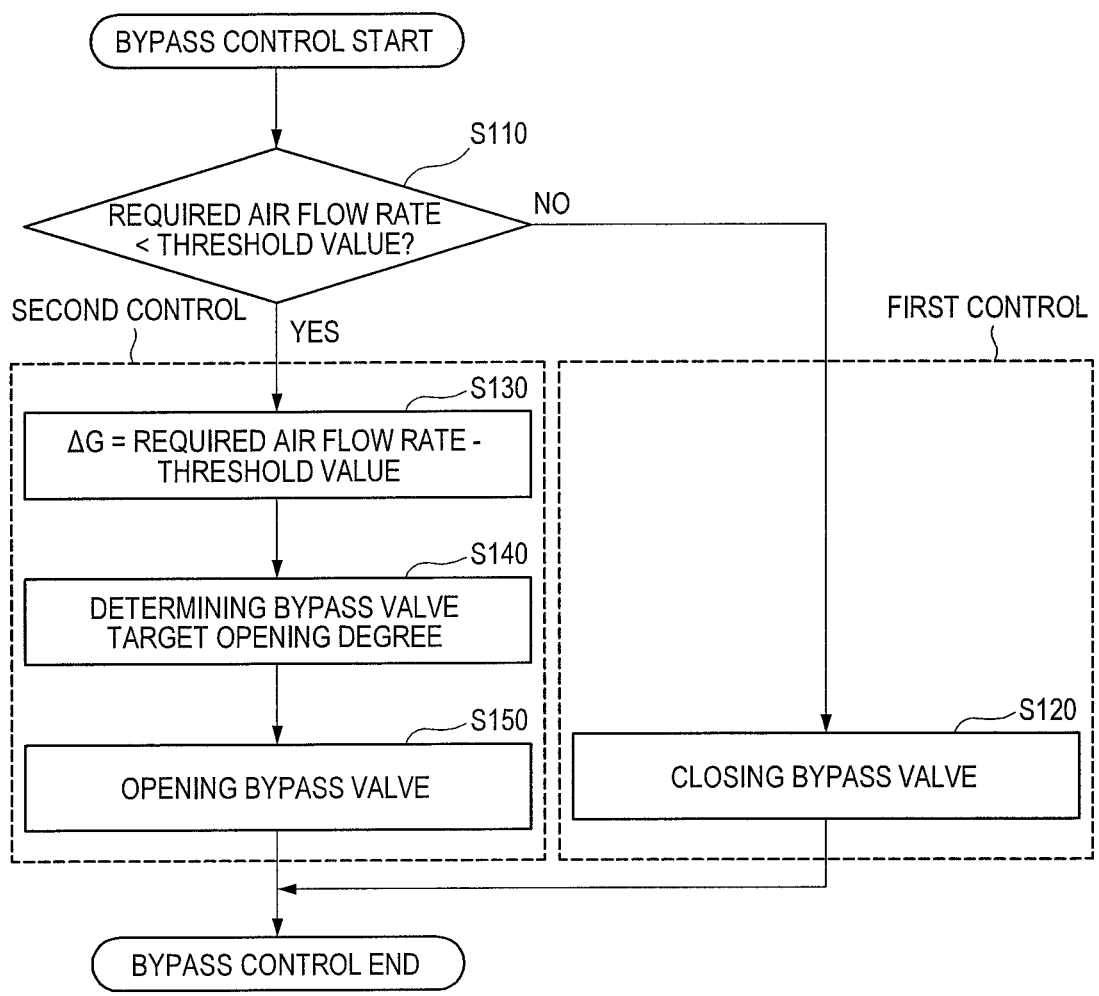
FIG. 3 is a flowchart showing contents of a bypass control process according to the first embodiment.

FIG. 3 is a flowchart showing contents of a bypass control process. In this specification, the term "bypass control" refers to a process in which the controller 500 adjusts a flow rate of air flowing through the bypass flow path 230 by opening and closing the bypass valve 240 based on the required air flow rate. The bypass control process is started when the power generation of the fuel cell 100 is started, and continues to circulate until the power generation of the fuel cell 100 stops.

First, the controller 500 determines whether or not the required air flow rate is lower than a predetermined threshold value (step S110). In the present embodiment, the "predetermined threshold value" is determined based on the efficiency of the compressor 310. Specifically, the threshold value is a value of a flow rate Gmin (see FIG. 2) at which the power consumption of the motor 320 with respect to the discharged air amount of the compressor 310 becomes minimal in the fuel cell system 10. Also, the threshold value may correspond to a value determined based on the flow rate Gmin at which the power consumption of the motor 320 with respect to the discharged air amount of the compressor 310 becomes minimal in the fuel cell system 10. The threshold value is not limited to a value equal to the flow rate Gmin and may be a value slightly smaller than the flow rate Gmin.

If the required air flow rate is not lower than the predetermined threshold value (step S110: NO), the controller 500 closes the bypass valve 240 (step S120), and controls the driving of the motor 320 so that the air is caused to flow through the fuel cell 100 at a flow rate corresponding to the required air flow rate. This control is referred to as "first control."

On the other hand, if the required air flow rate is lower than the predetermined threshold value (step S110: YES), that is to say, if the discharged air amount of the compressor 310 is in the low efficiency region, the controller 500 controls the opening degree of the bypass valve 240 so that the air is also caused to flow through the bypass flow path 230, and controls the driving of the motor 320 so that the air is caused to flow through the fuel cell 100 at the flow rate corresponding to the required air flow rate. This control is referred to as "second control". More specifically, first, the controller 500 obtains a difference ΔG between the required air flow rate and the threshold value (step S130). Next, the controller 500 determines a target opening degree of the bypass valve 240 from a bypass valve target opening degree map stored in the memory (step S140).

FIG. 4 is an explanatory diagram showing the bypass valve target opening degree map. In the bypass valve target opening degree map, the target opening degree of the bypass valve 240 is recorded in association with the required air pressure and the difference ΔG between the required air flow rate and the threshold value. The term "target opening degree" refers to a target value of the opening degree of the bypass valve 240. The bypass valve target opening degree map may be acquired by obtaining an appropriate opening degree of the bypass valve 240 according to the difference ΔG between the required air flow rate and the threshold value, and the required air pressure, by a test that is performed in advance. The term "required air pressure" refers to an air pressure required for power generation of the fuel cell 100. The pressure of the air flowing in the fuel cell 100 is regulated so as to become the required air pressure, as the controller 500 controls a pressure regulating valve 221 or a pressure ratio that is a ratio of the pressure (suction air pressure) of the air sucked into the compressor 310 and the pressure (discharge air pressure) of the air discharged from the compressor 310. In step S140, the controller 500 may calculate the target opening degree of the bypass valve 240 based on a predetermined function, instead of referring to the bypass valve target opening degree map.

After determining the target opening degree of the bypass valve 240, the controller 500 opens the bypass valve 240 at the target opening degree (step S150 in FIG. 3) and controls the driving of the motor 320 so that the air is caused to flow through the fuel cell 100 at the flow rate corresponding to the required air flow rate. In the present embodiment, the controller 500 performs the second control while keeping a rotation number of the motor 320 constant. Furthermore, in the present embodiment, the controller 500 performs the second control while keeping constant the pressure ratio that is the ratio of the suction air pressure of the compressor 310 and the discharge air pressure of the compressor 310.

Figure 5:
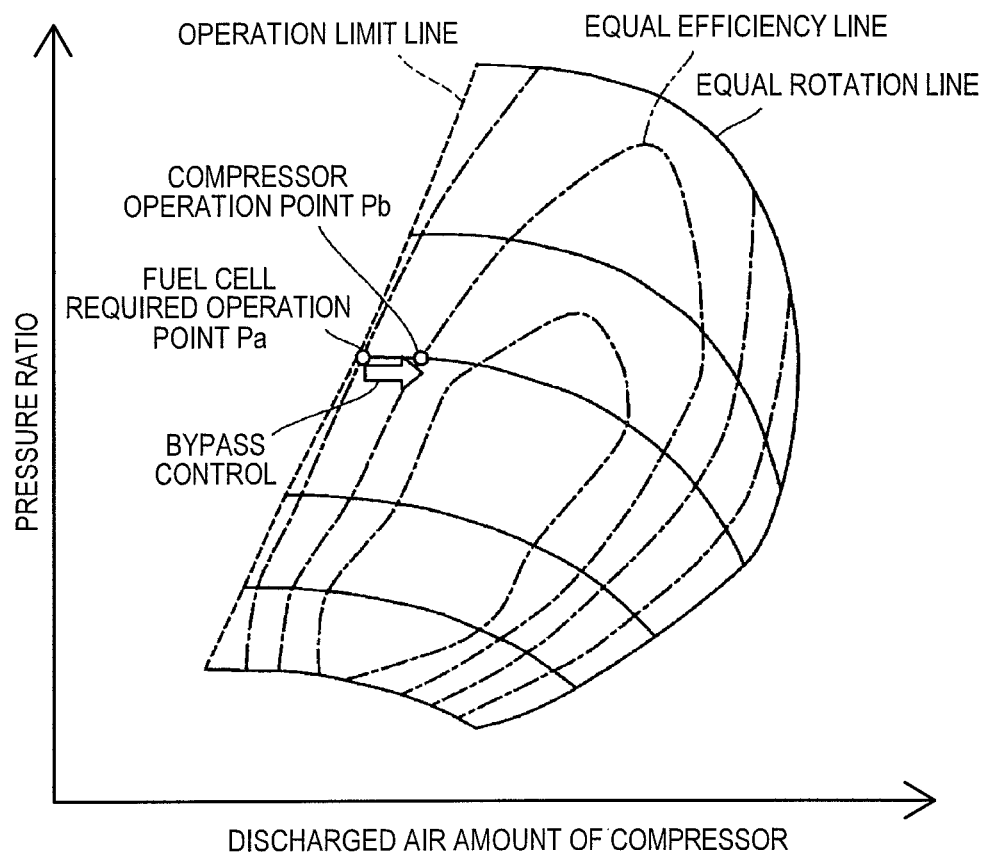
FIG. 5 is an explanatory diagram showing performance characteristics of the compressor.

FIG. 5 is an explanatory diagram showing performance characteristics of the compressor 310. The performance characteristics of the compressor 310 are obtained by a performance test of the compressor 310. The horizontal axis indicates the discharged air amount of the compressor 310. The vertical axis indicates the pressure ratio of the compressor 310. The equal rotation line is a line that connects operation points at which the rotation number of the compressor 310 remains the same. The equal efficiency line is a line that connects operation points at which the efficiency of the compressor 310 remains the same. The operation limit line is a line that connects operation points at which compressor 310 cannot pump air due to a rotation stall or the like.

The operation by the second control will be described with reference to FIG. 5. In a state in which the rotation number of the compressor 310 (the rotation number of the motor 320) is kept constant and in a state in which the pressure ratio of the compressor 310 is kept substantially constant (step S150 in FIG. 3), when the bypass valve 240 is opened to the target opening degree obtained using the bypass valve target opening degree map, a pressure loss on the downstream side of the compressor 310 decreases. Therefore, the flow rate of the air sucked into the compressor 310 increases and the discharged air amount of the compressor 310 increases. As the discharged air amount of the compressor 310 increases, the operation point of the compressor 310 shifts from the operation point Pa corresponding to the required air flow rate to the operation point Pb showing higher efficiency than the operation point Pa.

As the discharged air amount of the compressor 310 increases, air (surplus air) having a flow rate exceeding the required air flow rate is generated. However, at this time, the controller 500 adjusts the opening degree of the bypass valve 240 to an opening degree at which the air having the flow rate corresponding to the required air flow rate is caused to flow through the fuel cell 100 and at which the surplus air is caused to flow through the bypass flow path 230. Therefore, the flow rate of the air supplied to the fuel cell 100 does not change.

The surplus air is supplied to the turbine 330 via the bypass flow path 230 without passing through the interior of the fuel cell 100. Since the flow rate of the air supplied to the turbine 330 is the sum of the flow rate of the air discharged from the fuel cell 100 and the flow rate of the surplus air bypassed by the bypass flow path 230, the flow rate of the air supplied to the turbine 330 increases. The air supplied to the turbine 330 via the bypass flow path 230 is supplied to the turbine 330 while maintaining the flow rate, because oxygen is not consumed by the power generation of the fuel cell 100. Further, the surplus air flowing through the bypass flow path 230 is compressed by the compressor 310 and has a higher temperature than the air discharged from the fuel cell 100. Therefore, a drained water of the fuel cell 100 in the air discharge flow path 220 is evaporated by the surplus air and is supplied to the turbine 330. This increases the driving force of the turbine 330 for assisting the driving of the compressor 310 by the motor 320.

With the fuel cell system 10 of the present embodiment described above, when the required air flow rate is small, the air supplied by the compressor 310 is directly supplied not only to the fuel cell 100 but also to the turbine 330 for assisting the driving of the compressor 310 through the bypass flow path 230. Therefore, it is possible to reduce the power consumption of the motor 320 for driving the compressor 310 without lowering the flow rate of the air supplied to the fuel cell 100. This makes it possible to improve the fuel economy of the fuel cell system 10.

Further, in the present embodiment, the threshold value for determining whether or not to execute the above-described second control is set to a value determined based on the flow rate Gmin at which the power consumption of the motor 320 with respect to the discharged air amount of the compressor 310 becomes minimal in the fuel cell system 10. Therefore, when the required air flow rate corresponds to the low efficiency region of the compressor 310, the discharged air amount of the compressor 310 can be forcibly shifted to a high efficiency region. Further, in the present embodiment, the threshold value is set to the value of the flow rate Gmin at which the power consumption of the motor 320 with respect to the discharged air amount of the compressor 310 becomes minimal in the fuel cell system 10. Therefore, it is possible to minimize the power consumption of the motor 320 for driving the compressor 310 in the second control.

Further, in the present embodiment, the second control is performed while keeping the rotation number of the motor 320 constant. Therefore, it is possible to suppress increase in the power consumption of the motor 320 during the second control.

Further, in the present embodiment, the second control is performed while keeping the pressure ratio of the compressor 310 constant. In this regard, the suction air pressure of the compressor 310 is about the same as the atmospheric pressure and is hard to undergo a sudden change. Therefore, by performing the second control while keeping the pressure ratio of the compressor 310 constant, it is possible to suppress decrease in the pressure inside the fuel cell 100 at the time of the second control. Further, if the pressure in the fuel cell 100 decreases, a boiling point of water decreases and the electrolyte membrane of the fuel cell 100 easily dries. If the electrolyte membrane dries, ionic conductivity of the electrolyte membrane decreases and the generated power of the fuel cell 100 decreases. Therefore, by suppressing the decrease in the pressure inside the fuel cell 100 at the time of the second control, it is possible to suppress decrease in the generated power of the fuel cell 100.

As shown in FIG. 5, when the discharged air amount of the compressor 310 is increased by a certain amount or more in a state in which the discharged air amount of the compressor 310 is small, while keeping the rotation number of the motor 320 constant, the pressure ratio of the compressor 310 gradually decreases. In this case, in order to maintain the pressure ratio of the compressor 310 according to the required air pressure of the fuel cell 100, it is necessary to increase the rotation number of the motor 320 in response to the decrease in the pressure ratio of the compressor 310. This leads to an increase in the power consumption of the motor 320. However, in the present embodiment, the rotation number of the motor 320 is kept constant, and the second control is performed in a region where the pressure ratio of the compressor 310 does not decrease, that is to say, in a state in which the pressure ratio of the compressor 310 is constant. Therefore, it is possible to increase the discharged air amount of the compressor 310 without increasing the power consumption of the motor 320. In particular, in the present embodiment, the rotational force of the motor 320 can be assisted by the turbine 330 in the low efficiency region. Therefore, it is possible to reduce the power consumption of the motor 320 while maintaining the rotation number of the motor 320. In the present embodiment, the rotation number of the motor 320 and the pressure ratio of the compressor 310 are kept constant. However, one of the rotation number of the motor 320 and the pressure ratio of the compressor 310 may be changed within a range in which the power consumption of the motor 320 does not increase.

In the present embodiment, the "predetermined threshold value" is determined based on the efficiency of the compressor 310. Alternatively, the "predetermined threshold value" may be determined based on the discharged air amount of the compressor 310. For example, the discharged air amount of the compressor 310 may be divided into a region having a large flow rate and a region having a small flow rate, and the threshold value may be determined by using a value serving as a boundary between the two regions. Even in this case, it is possible to suppress the driving of the compressor 310 in the low efficiency region.

B. Second Embodiment

Figure 6:
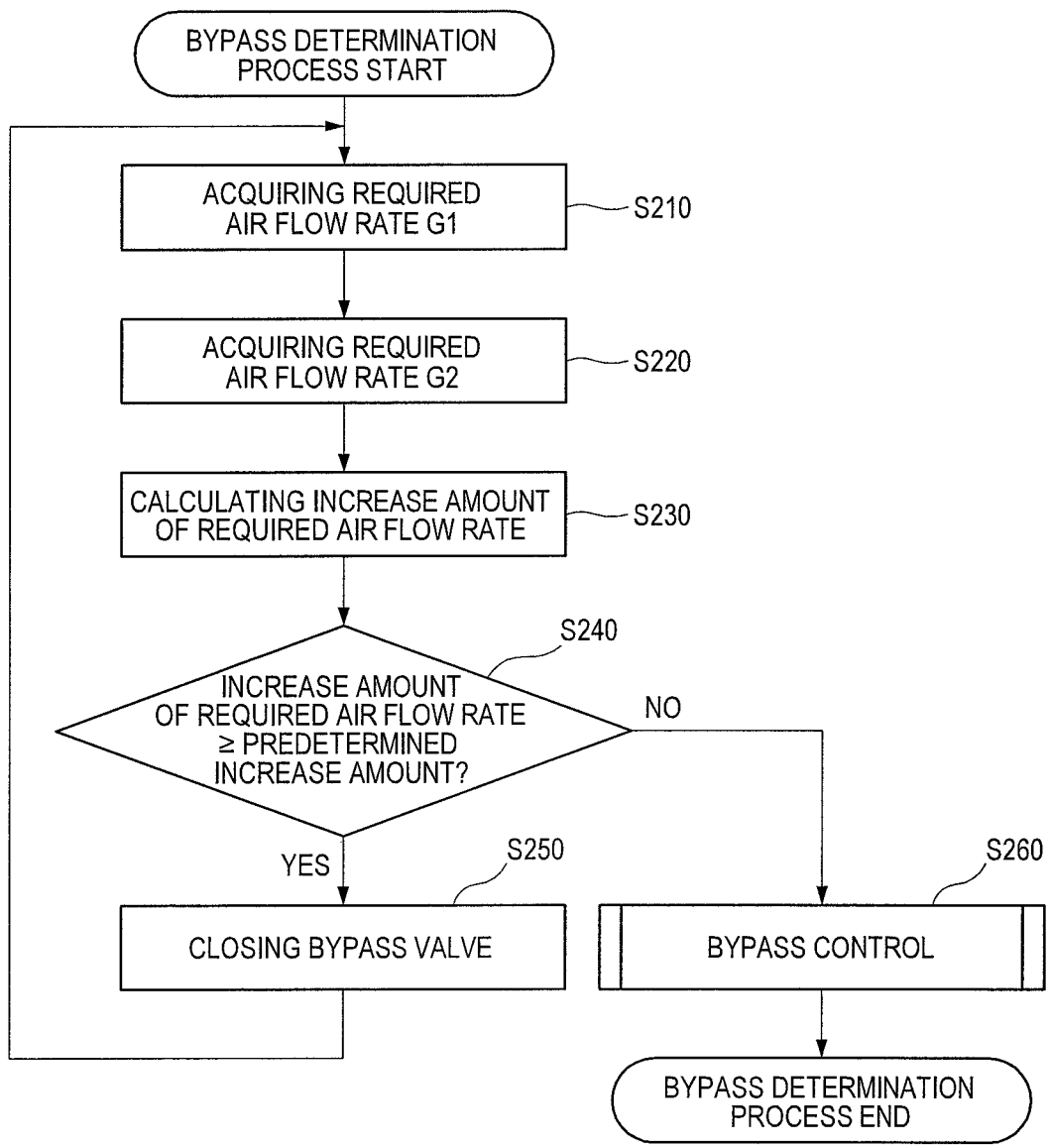
FIG. 6 is a flowchart showing contents of a bypass determination process according to a second embodiment.

FIG. 6 is a flowchart showing contents of a bypass determination process according to a second embodiment. This process is a process for determining whether or not to execute the bypass control process shown in FIG. 3. This process is started when the power generation of the fuel cell 100 is started, and continues to circulate until the power generation of the fuel cell 100 stops. In the second embodiment, the configuration of the fuel cell system 10 is the same as that of the first embodiment (FIG. 1).

In the fuel cell system 10 of the second embodiment, the controller 500 acquires a required air flow rate G1 at time t1 that is Δt second (e.g., one second) before time t2 that is a current time (step S210), and then acquires a required air flow rate G2 at time t2 (step S220). Next, the controller 500 obtains an increase amount of the required air flow rate per unit time using the required air flow rate G1 at time t1 and the required air flow rate G2 at time t2 (step S230), and determines whether or not the increase amount of the required air flow rate per unit time is equal to or larger than a predetermined increase amount (step S240). When the increase amount of the required air flow rate per unit time is equal to or larger than the predetermined increase amount (step S240: YES), the controller 500 closes the bypass valve 240 regardless of whether or not the required air flow rate is lower than the threshold value (step S250), and controls the driving of the motor 320 so that air is caused to flow through the fuel cell 100 at a flow rate corresponding to the required air flow rate. Thereafter, the process returns to step S210. On the other hand, when the increase amount of the required air flow rate per unit time is smaller than the predetermined increase amount (step S240: NO), the controller 500 executes the bypass control as in the first embodiment (step S260). Thereafter, the process starts again from step S210.

In the fuel cell system 10 of the present embodiment described above, when the increase amount of the required air flow rate per unit time is equal to or larger than the predetermined increase amount, the bypass valve 240 is closed regardless of whether or not the required air flow rate is lower than the threshold value, and the driving of the motor 320 is controlled so that the air is caused to flow through the fuel cell 100 at a flow rate corresponding to the required air flow rate. Therefore, when the increase amount of the required air flow rate per unit time is sharply increased to or above the predetermined increase amount, it is possible to prevent a part of the air having the flow rate corresponding to the increased required air flow rate from flowing toward the bypass flow path 230 without being supplied to the fuel cell 100. As a result, when the required air flow rate rapidly increases, it is possible to suppress a delay in the supply of air to the fuel cell 100. In a fuel cell vehicle, it is possible to suppress a delay in time from a time when an accelerator is stepped on and the required air flow rate of the fuel cell 100 is increased in response to the increase in the power consumption of the fuel cell vehicle to a time when the air having a flow rate corresponding to the increased required air flow rate is actually supplied to the fuel cell 100. Therefore, it is possible to suppress deterioration of drivability due to a delay of a response to an acceleration request.

C. Third Embodiment

Figure 7:
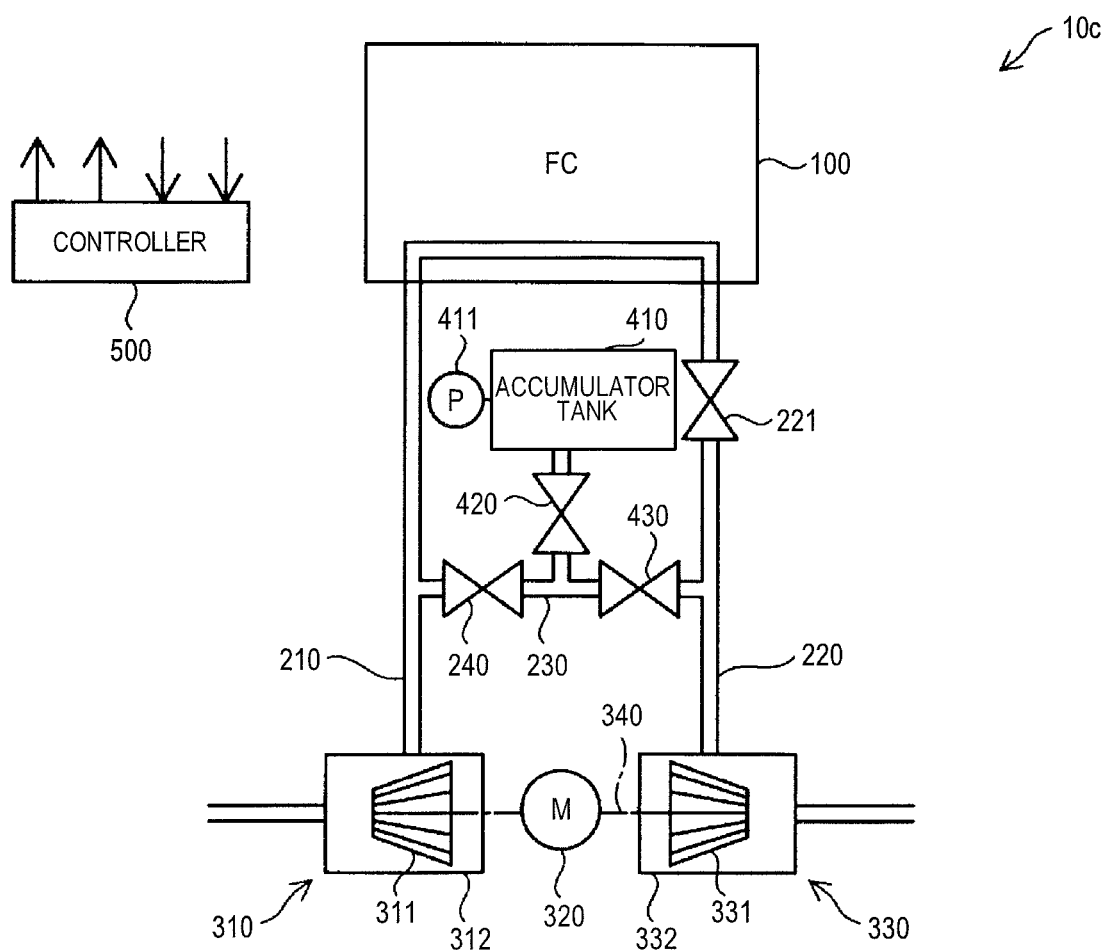
FIG. 7 is an explanatory diagram showing an outline of a fuel cell system according to a third embodiment.

FIG. 7 is an explanatory diagram showing an outline of a fuel cell system 10c according to a third embodiment. The fuel cell system 10c of the third embodiment differs from the fuel cell system 10 of the first embodiment (FIG. 1) in that the fuel cell system 10c includes an accumulator tank 410, a tank pressure sensor 411, a first tank valve 420, and a second tank valve 430. Further, in the third embodiment, conditions for executing the bypass control are different from those of the first embodiment (FIG. 3).

The accumulator tank 410 is connected to a downstream side of the bypass valve 240 in the bypass flow path 230. The accumulator tank 410 is a tank for storing the air flowing through the bypass flow path 230.

The tank pressure sensor 411 is a pressure sensor for acquiring a pressure of the air stored in the accumulator tank 410.

The first tank valve 420 is disposed at a connecting portion between the accumulator tank 410 and the bypass flow path 230. The first tank valve 420 is a valve for opening and closing connection between the accumulator tank 410 and the bypass flow path 230.

The second tank valve 430 is disposed on a downstream side of the accumulator tank 410 in the bypass flow path 230. The second tank valve 430 is a valve for opening and closing the bypass flow path 230.

Figure 8:
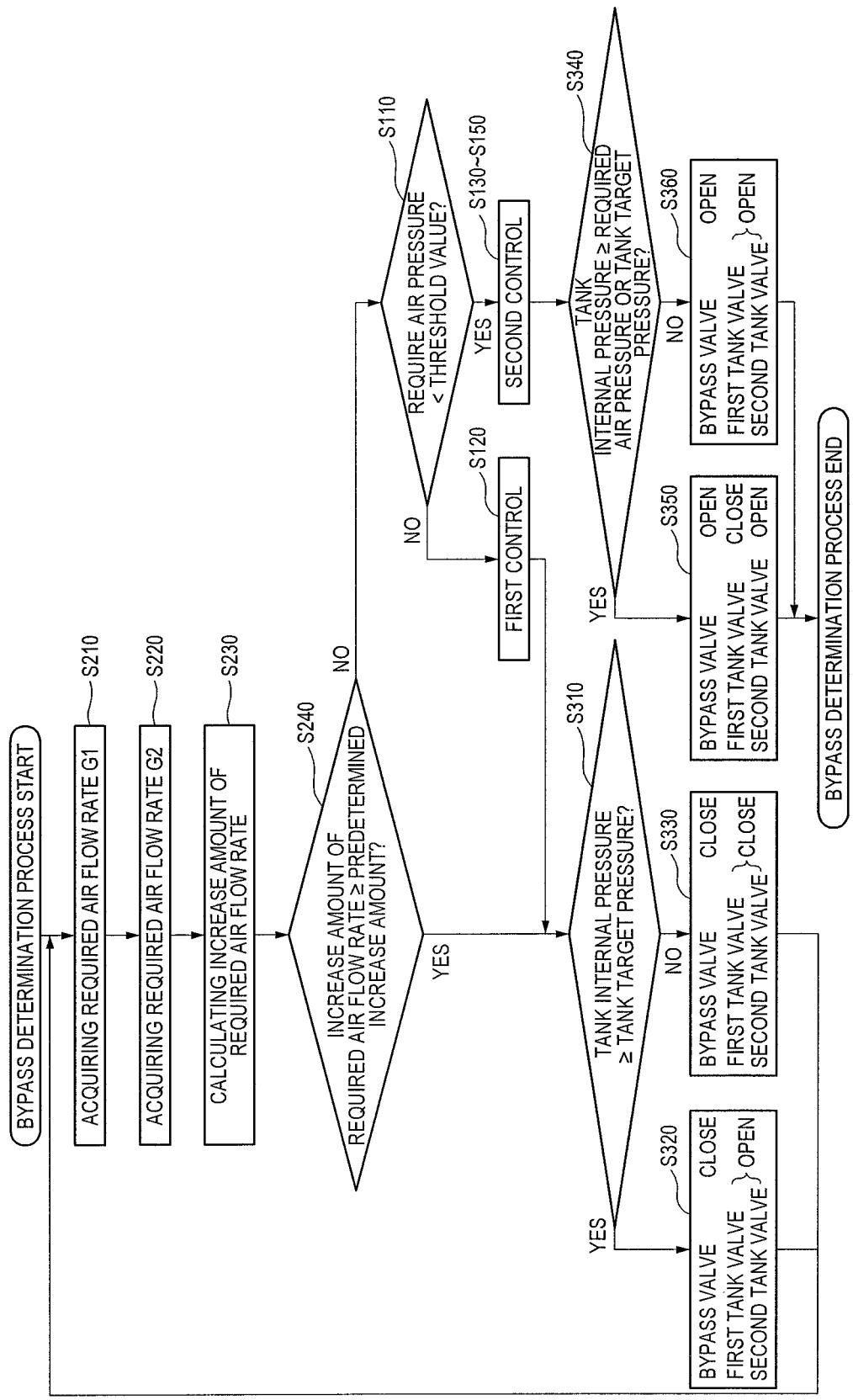
FIG. 8 is a flowchart showing contents of a bypass determination process according to the third embodiment.

FIG. 8 is a flowchart showing contents of a bypass determination process according to a third embodiment. This process is started when the power generation of the fuel cell 100 is started, and continues to circulate until the power generation of the fuel cell 100 stops. The contents of the process of bypass control in the third embodiment when the required air flow rate is increased are partly the same as the process of bypass control in the second embodiment shown in FIG. 6 when the required air flow rate is increased. Therefore, in FIG. 8, the same step number as those of FIG. 6 is used for the same process contents as those of FIG. 6.

In the fuel cell system 10c of the third embodiment, the controller 500 acquires the required air flow rate G1 at time t1 that is Δt second (e.g., one second) before time t2 that is a current time (step S210), and then acquires the required air flow rate G2 at time t2 (step S220). Next, the controller 500 obtains the increase amount of the required air flow rate per unit time using the required air flow rate G1 at time t1 and the required air flow rate G2 at time t2 (step S230), and determines whether or not the increase amount of the required air flow rate per unit time is equal to or larger than the predetermined increase amount (step S240).

When the increase amount of the required air flow rate per unit time is equal to or larger than the predetermined increase amount (step S240: YES), the controller 500 determines whether or not a tank internal pressure is equal to or higher than a tank target pressure (Step S310). The "tank internal pressure" is a pressure acquired by the tank pressure sensor 411 and is a pressure of the air actually stored in the accumulator tank 410. The "tank target pressure" is a target value of the pressure of the air stored in the accumulator tank 410. The tank target pressure may be determined in advance as a pressure suitable for reducing the power consumption of the motor 320 by supplying the air stored in the accumulator tank 410 to the turbine 330. When the tank internal pressure is equal to or higher than the tank target pressure (step S310: YES), the bypass valve 240 is closed and the first tank valve 420 and the second tank valve 430 are opened (step S320). Therefore, when the tank internal pressure is equal to or higher than the tank target pressure, the high pressure air stored in the accumulator tank 410 can be supplied to the turbine 330 while preventing the air stored in the accumulator tank 410 from flowing back from the bypass flow path 230 to the air supply flow path 210. After step S320, the process returns to step S210 again. On the other hand, when the tank internal pressure is lower than the tank target pressure (step S310: NO), the controller 500 closes the bypass valve 240, the first tank valve 420, and the second tank valve 430 (step S330). Therefore, when the tank internal pressure does not reach the tank target pressure and the effect of reducing the power consumption of the motor 320 with respect to the required air flow rate is small, the air stored in the accumulator tank 410 is not released. Incidentally, in step S330, either the first tank valve 420 or the second tank valve 430 may be in an open state. After step S330, the process returns to step S210 again.

In step S240 described above, when the increase amount of the required air flow rate per unit time is smaller than the predetermined increase amount (step S240: NO), the controller 500 executes the bypass control as in the first embodiment, and determines whether or not the required air flow rate is lower than the predetermined threshold value (step S110). When the required air flow rate is not lower than the predetermined threshold value (step S110: NO), the controller 500 executes the first control and brings the bypass valve 240 into a closed state (step S120 in FIG. 3). Thereafter, the controller 500 causes the process to proceed to step S310 described above. On the other hand, when the required air flow rate is lower than the predetermined threshold value (step S110: YES), the controller 500 executes the second control (steps S130 to S150 in FIG. 3). Thereafter; the controller 500 determines whether or not the tank internal pressure is equal to or higher than the required air pressure or the tank target pressure (step S340). When the tank internal pressure is equal to or higher than the required air pressure or the tank target pressure (step S340: YES), the controller 500 opens the bypass valve 240 and the second tank valve 430, and closes the first tank valve 420 (step S350). Therefore, while preventing the air stored in the accumulator tank 410 from flowing back from the bypass flow path 230 to the air supply flow path 210, the air discharged from the compressor 310 can be bypassed from the air supply flow path 210 to the air discharge flow path 220 via the bypass flow path 230. On the other hand, when the tank internal pressure is lower than the required air pressure or the tank target pressure (step S340: NO), the controller 500 opens the bypass valve 240, the first tank valve 420, and the second tank valve 430 (Step S360). Therefore, while bypassing the air from the air supply flow path 210 to the air discharge flow path 220 via the bypass flow path 230, a part of the air to be bypassed can be stored in the accumulator tank 410.

In the fuel cell system 10c of the present embodiment described above, during the second control, a part of the surplus air flowing through the bypass flow path 230 can be stored in the accumulator tank 410. Even when the bypass valve 240 is closed, the air stored in the accumulator tank 410 during the second control can be supplied to the turbine 330. Therefore, even when the bypass valve 240 is closed, it is possible to increase the driving force of the turbine 330 for assisting the driving of the compressor 310 by the motor 320. In a fuel cell vehicle, as in the second embodiment, when an accelerator is stepped on, it is possible to suppress a delay in the time required until the air having a flow rate corresponding to the increased required air flow rate is actually supplied to the fuel cell 100. Furthermore, during a driving of the fuel cell vehicle in a region other than the low efficiency region (e.g., during a steady travelling on an expressway) or when there is an acceleration request, even if the bypass valve 240 is in a closed state, it is possible to increase the driving force by the turbine 330. Therefore, it is possible to suppress deterioration of drivability due to a delay of a response to an acceleration request and to improve acceleration performance of the fuel cell vehicle.

The fuel cell system 10c according to the present embodiment includes the first tank valve 420 and the second tank valve 430. However, the first tank valve 420 and the second tank valve 430 are not essential components. Even if the first tank valve 420 and the second tank valve 430 are not provided, the air can be stored in the accumulator tank 410 during the second control. Therefore, when the bypass valve 240 is closed, the air stored in the accumulator tank 410 can be supplied to the turbine 330. Accordingly, even in such a configuration, even if the bypass valve 240 is closed, it is possible to increase the driving force of the turbine 330.

D. Fourth Embodiment

Figure 9:
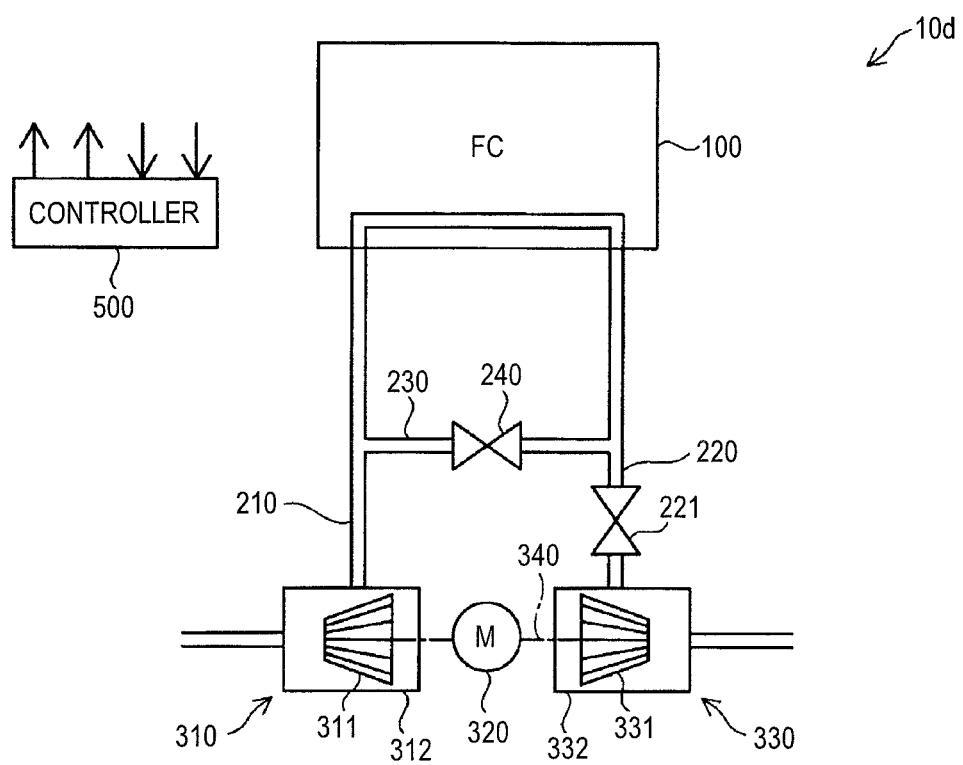
FIG. 9 is an explanatory diagram showing an outline of a fuel cell system according to a fourth embodiment.

FIG. 9 is an explanatory diagram showing an outline of a fuel cell system 10d according to a fourth embodiment. In the fuel cell system 10 shown in FIG. 1, the pressure regulating valve 221 is disposed on the downstream side of the fuel cell 100 in the air discharge flow path 220 and on the upstream side of the connection portion between the bypass flow path 230 and the air discharge flow path 220. However, in the present embodiment, as shown in FIG. 9, the pressure regulating valve 221 is disposed on an upstream side of the turbine 330 in the air discharge flow path 220 and on a downstream side of the connection portion between the bypass flow path 230 and the air discharge flow path 220. This makes it possible to suppress abrupt fluctuation of the pressure on the upstream side of the pressure regulating valve 221. Therefore, it is possible to prevent the pressure inside the fuel cell 100 from rapidly decreasing along with the opening and closing of the bypass valve 240.

E. Fifth Embodiment

Figure 10:
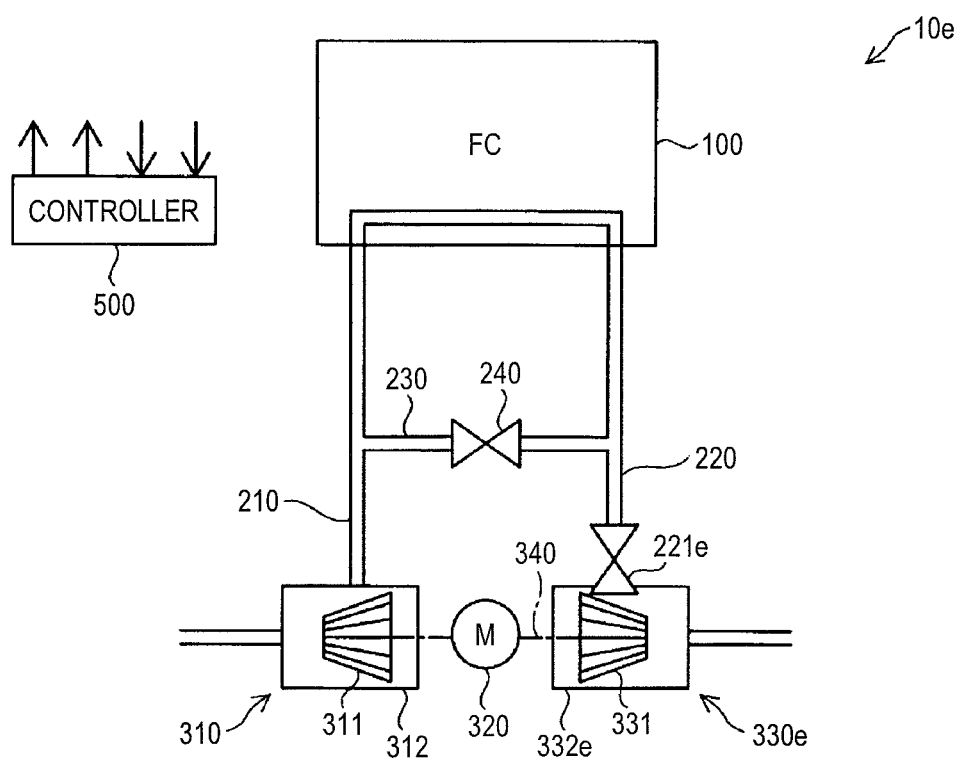
FIG. 10 is an explanatory diagram showing an outline of a fuel cell system according to a fifth embodiment.

FIG. 10 is an explanatory diagram showing an outline of a fuel cell system 10e according to a fifth embodiment. In the fuel cell system 10d shown in FIG. 9, the pressure regulating valve 221 and the turbine housing 332 are separately provided. However, in the present embodiment, as shown in FIG. 10, a pressure regulating valve 221e and a turbine housing 332e are integrated. More specifically, the valve box of the pressure regulating valve 221e is formed integrally with the turbine housing 332e, and the valve body of the pressure regulating valve 221e is disposed on an upstream side of the turbine wheel 331 in a turbine 330e. For example, the turbine 330e of the present embodiment may be constituted by a variable nozzle turbocharger in which an air suction port of the turbine 330e and the pressure regulating valve 221e are integrally formed. Thus, by adjusting the opening degree of the pressure regulating valve 221e, it is possible to change a flow velocity of the air blown to the turbine wheel 331. Therefore, the configuration of the fuel cell system 10e can be simplified, and the driving force of the turbine 330e for assisting the driving of the compressor 310 by the motor 320 can be increased.

F. Sixth Embodiment

Figure 11:
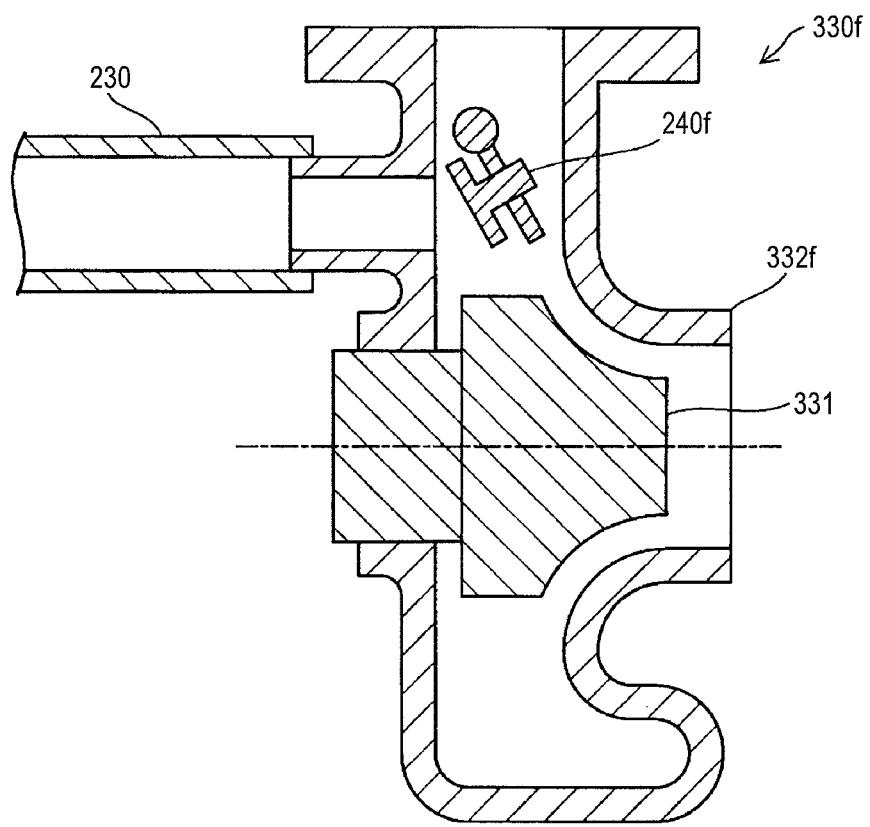
FIG. 11 is a schematic sectional view showing a turbine according to a sixth embodiment.

FIG. 11 is a schematic sectional view showing a turbine 330f according to a sixth embodiment. In the fuel cell system 10 shown in FIG. 1, the bypass flow path 230 is connected to the air discharge flow path 220. However, in the present embodiment, as shown in FIG. 11, the bypass flow path 230 is directly connected to the inside of a turbine housing 332f of the turbine 330f, a valve box of a bypass valve 240f is integrated with the turbine housing 332f, and a valve body of the bypass valve 240f is disposed on the upstream side of the turbine wheel 331 in the turbine 330f. Thus, the configuration of the fuel cell system 10 can be simplified.

G. Seventh Embodiment

Figure 12:
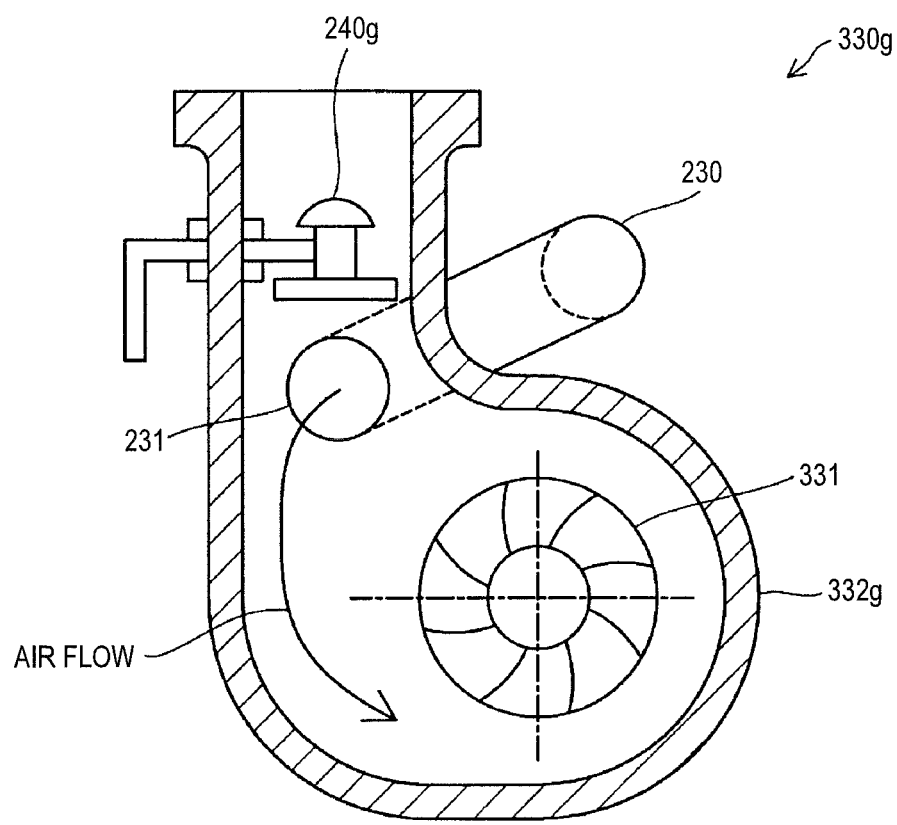
FIG. 12 is a schematic sectional view showing a turbine according to a seventh embodiment.

FIG. 12 is a schematic sectional view showing a turbine 330g according to a seventh embodiment. In the turbine 330f shown in FIG. 11, the bypass flow path 230 is directly connected to the inside of the turbine housing 332f of the turbine 330f. In the present embodiment, as shown in FIG. 12, the bypass flow path 230 is also directly connected to the turbine housing 332g of the turbine 330g. Further, an opening 231 of the bypass flow path 230 in the turbine housing 332g is oriented so that the air flowing from the bypass flow path 230 into the turbine housing 332g flows in such a direction as to promote rotation of the turbine wheel 331 of the turbine 330g. As a result, the air flowing from the bypass flow path 230 into the turbine housing 332g does not hinder the rotation of the turbine wheel 331 and promotes the rotation of the turbine wheel 331. Therefore, the configuration of the fuel cell system 10 can be simplified, and the driving force of the turbine 330g for assisting the driving of the compressor 310 by the motor 320 can be increased.

H. Eighth Embodiment

In the fuel cell system 10c shown in FIG. 7, the first tank valve 420 is disposed at the connection portion between the accumulator tank 410 and the bypass flow path 230, and the first tank valve 420 also serves as an air inlet and an air outlet of the accumulator tank 410. However, an air inlet and an air outlet of the accumulator tank 410 may be separately provided at the connection portion between the accumulator tank 410 and the bypass flow path 230, and valves for opening and closing the connection between the accumulator tank 410 and the bypass flow path 230 may be disposed on the inlet side and the outlet side, respectively. In this case, when storing the air in the accumulator tank (step S360 in FIG. 8), the inlet side valve is opened and the outlet side valve is closed. Further, when releasing the air stored in the accumulator tank (step S320 in FIG. 8), the inlet side valve is closed and the outlet side valve is opened. Even in the fuel cell system 10 of this the present embodiment, the same effects as those of the third embodiment can be obtained.

I. Ninth Embodiment

In the fuel cell system 10 shown in FIG. 1, an intercooler for cooling the air flowing through the air supply flow path 210 may be disposed on an upstream side of the fuel cell 100 in the air supply flow path 210 and on a downstream side of the connection portion between the bypass flow path 230 and the air supply flow path 210. With this configuration, the temperature of the air supplied to the fuel cell 100 can be lowered, the drying of the electrolyte membrane of the fuel cell 100 can be suppressed, and a density of the air supplied to the fuel cell 100 can be increased.

The disclosure is not limited to the above-described embodiments and may be realized in various configurations without departing from the spirit of the disclosure. For example, in order to solve some or all of the above-mentioned problems, or in order to achieve some or all of the above-mentioned effects, the technical features in the embodiments corresponding to the technical features in the respective forms described in the Summary may be replaced or combined as necessary. In addition, unless the technical features are described as being essential in this specification, they may be deleted as appropriate.

What is claimed is:

1. A fuel cell system comprising:
   a fuel cell;
   an air supply flow path configured to supply air to the fuel cell;
   an air discharge flow path configured to discharge the air from the fuel cell;
   a compressor configured to supply the air to the air supply flow path;
   a motor configured to drive the compressor;
   a turbine disposed in the air discharge flow path to assist driving of the compressor by the motor;
   a bypass flow path configured to bring a downstream side of the compressor in the air supply flow path into communication with an upstream side of the turbine in the air discharge flow path;
   a bypass valve configured to open and close the bypass flow path; and
   a controller including a central processing unit and a memory, wherein the central processing unit is configured to execute a control program stored in the memory to:
     control driving of the motor and opening and closing of the bypass valve according to a required air flow rate that is an air flow rate required for power generation of the fuel cell,
     when the required air flow rate is equal to or higher than a predetermined threshold value, perform a first control to close the bypass valve and control the driving of the motor to cause the air to flow through the fuel cell at a flow rate corresponding to the required air flow rate, and
     when the required air flow rate is lower than the predetermined threshold value, perform a second control to open the bypass valve to cause the air to also flow through the bypass flow path and control the driving of the motor to cause the air to flow through the fuel cell at the flow rate corresponding to the required air flow rate.

2. The fuel cell system according to claim 1, wherein the predetermined threshold value is a value determined based on a flow rate at which power consumption of the motor with respect to a flow rate of air discharged from the compressor in the fuel cell system becomes minimal.

3. The fuel cell system according to claim 1, wherein the central processing unit is further configured to execute the control program stored in the memory to:
   when an increase amount of the required air flow rate per unit time is equal to or larger than a predetermined increase amount, close the bypass valve regardless of whether or not the required air flow rate is lower than the predetermined threshold value.

4. The fuel cell system according to claim 1, further comprising an accumulator tank connected to a downstream side of the bypass valve in the bypass flow path and configured to store the air flowing through the bypass flow path.

5. The fuel cell system according to claim 1, further comprising a pressure regulating valve disposed on the upstream side of the turbine in the air discharge flow path and on a downstream side of a connection portion between the bypass flow path and the air discharge flow path and configured to regulate a pressure of the air flowing through the fuel cell.

6. The fuel cell system according to claim 5, wherein:
   a valve box of the pressure regulating valve is formed integrally with a turbine housing of the turbine; and
   a valve body of the pressure regulating valve is disposed on an upstream side of a turbine wheel in the turbine.

7. The fuel cell system according to claim 1, wherein:
   the bypass flow path is connected to an inside of a turbine housing of the turbine;
   a valve box of the bypass valve is formed integrally with the turbine housing; and
   a valve body of the bypass valve is disposed on an upstream side of a turbine wheel in the turbine.

8. The fuel cell system according to claim 1, wherein the bypass flow path is connected to an inside of a turbine housing of the turbine, and an opening of the bypass flow path in the turbine housing is oriented to cause the air flowing from the bypass flow path into the turbine housing to flow in such a direction as to promote rotation of a turbine wheel of the turbine.

9. The fuel cell system according to claim 1, wherein the central processing unit is further configured to execute the control program stored in the memory instructions to:
   perform the second control with a rotation number of the motor being kept constant.

10. The fuel cell system according to claim 1, wherein the central processing unit is further configured to execute the control program stored in the memory to:
   perform the second control with a pressure ratio being kept constant, the pressure ratio being a ratio of a pressure of air sucked into the compressor and a pressure of air discharged from the compressor.

* * * * *